United States Patent [19]

Nakamoto

[11] 4,135,284

[45] Jan. 23, 1979

[54] TOOL FOR MOUNTING RETAINING RINGS ON A SHAFT

[75] Inventor: Yakayuki Nakamoto, Tokyo, Japan

[73] Assignee: Iwata Electric Works, Ltd., Tokyo, Japan

[21] Appl. No.: 853,870

[22] Filed: Nov. 22, 1977

[30] Foreign Application Priority Data

Jun. 4, 1977 [JP] Japan ................................ 52-72964

[51] Int. Cl.$^2$ .............................................. B23F 19/04

[52] U.S. Cl. ......................................... 29/229; 81/355

[58] Field of Search ................. 29/229, 225, 268, 235, 29/239; 81/355, 363, 376

[56] References Cited

U.S. PATENT DOCUMENTS

| | | | |
|---|---|---|---|
| 2,175,626 | 10/1939 | Butler | 29/229 |
| 2,914,976 | 12/1959 | Demler | 81/355 |
| 3,785,037 | 1/1974 | Erdmann | 29/229 |

*Primary Examiner*—James L. Jones, Jr.
*Attorney, Agent, or Firm*—Oblon, Fisher, Spivak, McClelland & Maier

[57] ABSTRACT

Disclosed is a hand tool for mounting and removing split retaining rings on a shaft consisting of plier-like grip handles pivoted on a base plate, said base plate having a hole therethrough to accommodate the shaft. An abutment means is provided on the end of the base plate adjacent the hole and a moveable camming device faces the abutment means on the opposite side of the hole. The retaining ring is gripped between the abutment means and the camming device, and the ring is expanded to accommodate the shaft by the movement of the camming device into the split of the ring and toward the abutment means.

5 Claims, 6 Drawing Figures

TOOL FOR MOUNTING RETAINING RINGS ON A SHAFT

BACKGROUND OF THE INVENTION

The use of split retaining rings on shafts is well-known. Basically, a split ring consists of a circle of spring steel or the like having a split at one location on the circumference of the ring. The split allows the ring to be expanded to fit over a shaft, but the natural spring resilience of the ring allows it to snap into an accommodating groove cut into the shaft and thus the ring may serve as a retaining means to either fix the shaft in position or retain other elements on the shaft. In the course of mounting and demounting split retaining rings on a shaft by means of a hand tool, it would be desirable to have a tool requiring a minimum of adjustment and which would permit the ring to be expanded yet avoid a mechanism that could expand the ring beyond its elastic limit.

SUMMARY OF THE INVENTION

The present invention consists of a hand tool for mounting and demounting split retaining rings on a shaft. A base plate has a narrowed end with a shaft accommodating hole passing therethrough. On the extreme end of the narrowed end of the base plate is a ring abutment means consisting of an arcuate protrusion and on the other side of the hole is a moveable camming means with a wedge-shaped leading edge. The tool is positioned over the shaft so the shaft may extend through the shaft accommodating hole in the base plate. The split retaining ring is gripped between the arcuate abutment means and the camming means with the wedge-shaped edge positioned in the split of the ring. The camming means is actuated in the direction of the abutment means such that the camming means advances into the split and expands the ring to an extent that the ring can be positioned around the shaft. The camming means is actuated by squeezing a pair of plier-like handles and several embodiments are disclosed wherein the handles may either be in the same plane as the base plate or may be angled away. This latter arrangement facilitates the placement of a ring on a shaft if the shaft is protruding from a surface having a relatively large extent which would interfere with the operator's hand. Further, the base plate may be angled so that the narrowed end with the hole is at right angles to the handle if shaft access requirements do dictate. Removal of a ring from a shaft is accomplished by merely reversing the operation described above.

BRIEF DESCRIPTION OF THE DRAWINGS

A more complete appreciation of the invention and many of the attendant advangages thereof will be readily attained as the same becomes better understood by reference to the following detailed description when considered in connection with the accompanying drawings, wherein.

DESCRIPTION OF THE PREFERRED EMBODIMENTS

Figure 1:
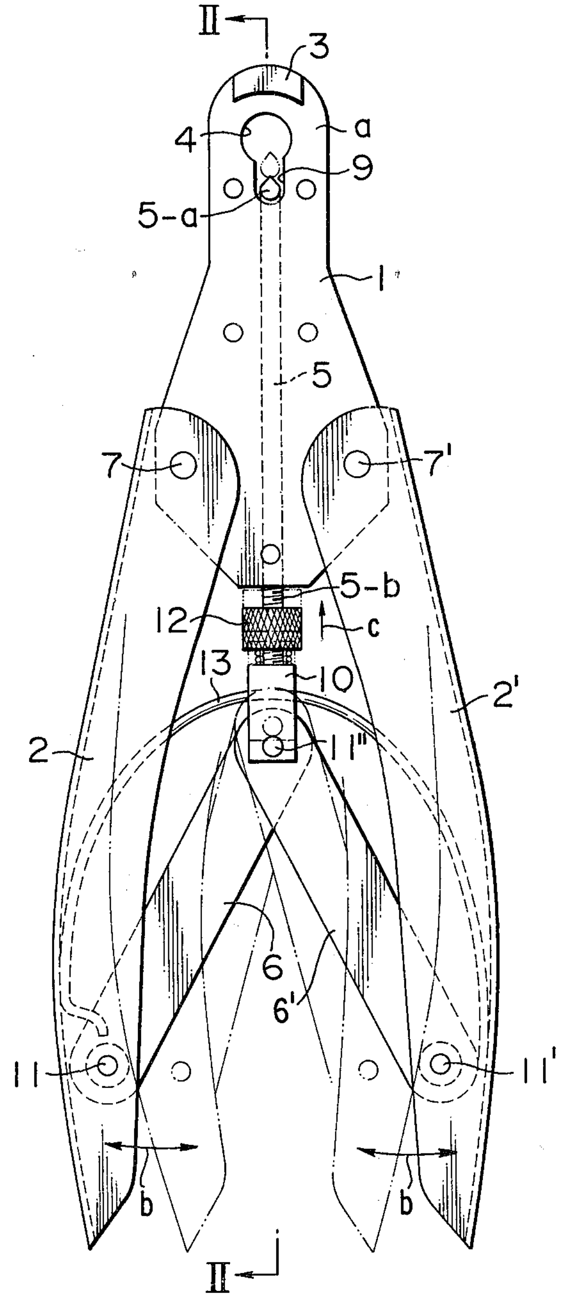
FIG. 1 is an elevation view of a first embodiment of the present invention.
Figure 2:
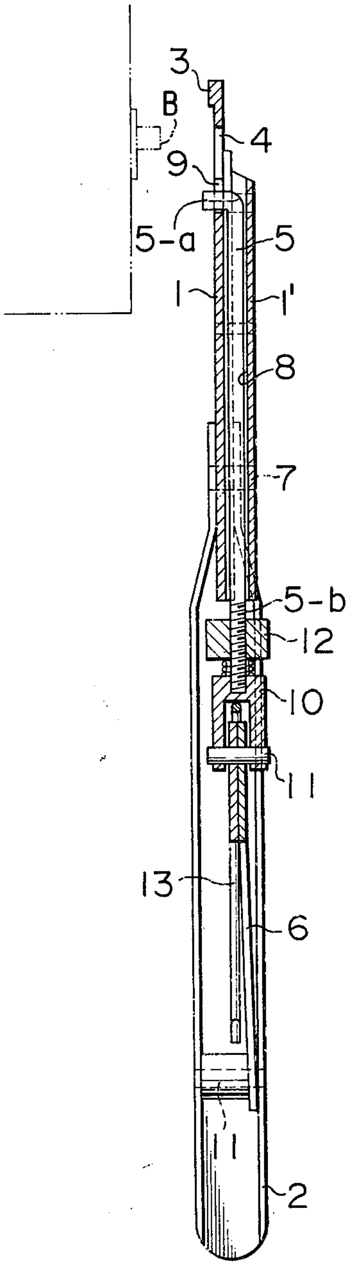
FIG. 2 is a cross-sectional side view of the embodiment shown in FIG. 1.

A first embodiment, illustrated in FIGS. 1 and 2 consists of a base plate 1, having an elongated end a with a shaft accommodating hole 4 therethrough. At the other end of base plate 1 are two pliers-type grip levers 2 and 2', pivotally attached at pivots 7 and 7', and outwardly biased by spring 13. Two connecting links 6 and 6' are attached at one end to grip levers 2 and 2', respectively, by means of pivots 11 and 11', respectively, and at the other end to connecting yoke 10 by means of pivot 11''.

Rod 5 has screw threads **5*b* formed thereon at one end and is screwed into a mating hole in connecting yoke 10. Rod 5 extends along base plate 1 inside guide 8 which is established between base plate 1 and cover plate 1' (FIG. 2). The other end of rod 5 terminates with a right angle bend to form a wedge-shaped projection 5*a* that serves as a camming means to expand a split ring. Projection 5*a* extends through base plate 1 and lies in keyhole-shaped groove 9 which is a portion of hole 4. At the terminal end of base plate section a is an arcuate abutment means 3 that projects from base plate 1 in the same direction as camming means 5*a***.

The actuation of camming means **5*a* is shown by means of phantom lines in FIG. 1. Gripping levers 2-2' are squeezed by the hand of the operator and pivot inwardly against spring 13 as shown by arrows b. Links 6 and 6' are thus displaced toward the base plate and move connecting yoke 10 in the direction of arrow c. Yoke 10 thus moves rod 5 along guide 8 and camming means 5*a* is displaced along groove 9 and into hole 4. A motion limiting abutment 12 is threaded on portion 5*b* of rod 5 and may be adjusted along the length of rod 5 so that it abuts base plate 1 when camming means 5*a* has moved sufficiently into hole 4**.

Figure 3:
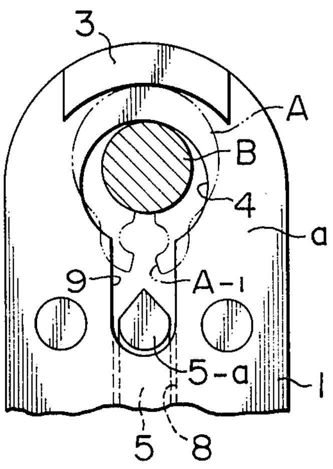
FIG. 3 is a detailed view of the mechanism to expand the ring shown prior to the expansion of the ring.
Figure 4:
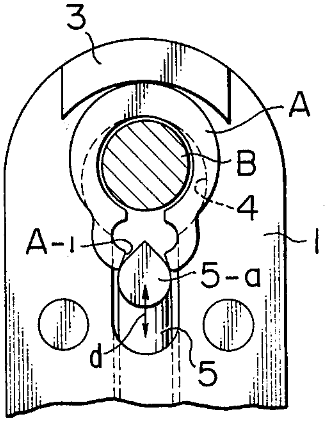
FIG. 4 is a detailed view of the mechanism to expand the ring shown after the ring is expanded.

The expansion of a split ring is illustrated in FIGS. 3 and 4. Split ring A, shown in phantom lines in FIG. 3, is in position on shaft B. The tool is positioned so that arcuate abutment 3 is in contact with the ring on the side opposite the split, and shaft B extends through hole 4. Squeezing the gripping levers causes camming means **5*a* to move in the direction shown by arrow d in FIG. 4 such that the wedge-shaped portion of camming means 5*a* moves into split A-1 in ring A. Split ring A is thus gripped between arcuate abutment 3 and camming means 5*a*, and as camming means 5*a* continues to move into slit A-1**, the wedge-shaped portion bearing on the ring at the split expands the diameter of the ring and permits it to be removed from shaft B. The operation is merely reversed to mount a ring on a shaft.

Figure 5:
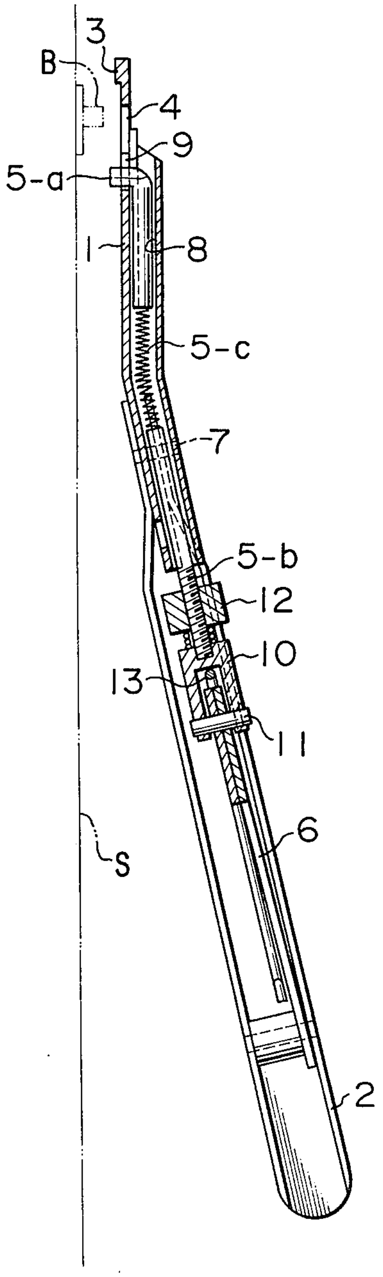
FIG. 5 is a cross-sectional side view of a second embodiment of the present invention.

A second embodiment of the tool is illustrated in FIG. 5, and is particularly useful when shaft B extends from a surface S having an extent of sufficient size to interfere with the hand of the operator if the tool was flat. Base plate 1 is bent so that the handle grips angle away from that side of the tool having arcuate abutment 3 thereon. Similar parts to those in the first embodiment are similarly numbered in the drawing, and the only significant difference is the replacement of the central portion of rod 5 with flexible linkage **5*c*. This flexible portion is able to bend and accommodate the angle in base plate 1** when the camming mechanism is actuated toward the split ring.

Figure 6:
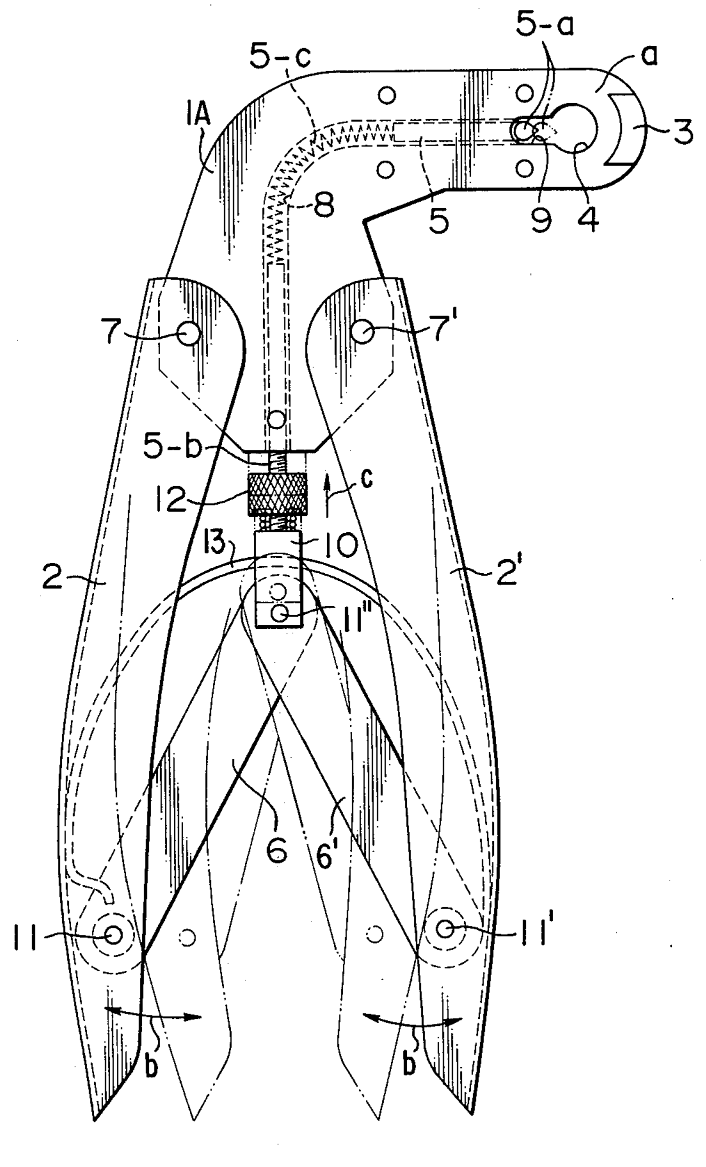
FIG. 6 is an elevation view of a third embodiment of the present invention.

A third embodiment of the present invention is illustrated in FIG. 6. In this embodiment like elements are again numbered as in the first embodiment. Base plate 1A is planar, but elongated end a is at right angles to the gripping levers. As in the second embodiment, flexible intermediate portion 5*c* of rod 5 allows flexure past the base plate angle as the camming mechanism is actuated. This embodiment is particularly useful in those applications where there is an obstacle in front of the shaft limiting the placement of the operator's hand.

Obviously, many variations and modifications of the present invention are possible in light of the above teachings. It is therefore to be understood that the invention may be practiced otherwise than as specifically described herein.

What is claimed as new and desired to be secured by Letters Patent of the United States is:

1. A tool for mounting and demounting split retaining rings comprising a base plate, a pair of gripping levers pivotally mounted on one end of said base plate, the other end of said base plate being elongated and having a shaft accommodating hole passing therethrough, an abutment means protruding from one side of said elongated end of said base plate between said hole and the end of said elongated end, and a moveable camming means positioned in a slot-like portion of said hole and projecting in the same direction as said abutment member, and means connecting said gripping levers with said camming means so that squeezing said gripping means causes said camming means to be actuated toward said abutment means whereby a split retaining ring held between said camming means and said abutment means may be expanded to be mounted or demounted on a shaft.

2. The tool of claim 1, wherein said base plate is angled so that said gripping levers angle away from the side of said base plate having said abutment means.

3. The tool of claim 1, wherein said elongated end of said base plate is at substantially a right angle to the end of said base plate carrying said gripping levers.

4. The tool of claim 1, wherein said camming means has a wedge-shped portion to enter the split of said ring and expand the ring upon actuation.

5. The tool of claim 1, wherein said means connecting said gripping levers with said camming means is a rod carried in a guide formed along said base plate.

* * * * *